United States Patent
Hibbard et al.

(10) Patent No.: US 7,652,619 B1
(45) Date of Patent: Jan. 26, 2010

(54) SYSTEMS AND METHODS USING MULTIPLE DOWN-CONVERSION RATIOS IN ACQUISITION WINDOWS

(75) Inventors: Mark Hibbard, Arlington, VA (US); Howard Bandell, Leesburg, VA (US)

(73) Assignee: Niitek, Inc., Sterling, VA (US)

( * ) Notice: Subject to any disclaimer, the term of this patent is extended or adjusted under 35 U.S.C. 154(b) by 0 days.

(21) Appl. No.: 11/754,152

(22) Filed: May 25, 2007

(51) Int. Cl.
*G01S 13/00* (2006.01)
(52) U.S. Cl. ............................ 342/195; 342/22; 342/175
(58) Field of Classification Search ................. 342/22, 342/175, 195
See application file for complete search history.

(56) References Cited

U.S. PATENT DOCUMENTS

| | | | |
|---|---|---|---|
| 3,639,784 A | 2/1972 | Kelleher, Jr. | |
| 4,438,404 A | 3/1984 | Philipp | |
| 4,581,715 A | 4/1986 | Hyatt | |
| 4,590,614 A | 5/1986 | Erat | |
| 4,678,345 A * | 7/1987 | Agoston | .............. 368/119 |
| 4,686,655 A | 8/1987 | Hyatt | |
| 4,715,000 A | 12/1987 | Premerlani | |
| 4,760,525 A | 7/1988 | Webb | |
| 5,003,562 A | 3/1991 | van Driest et al. | |
| 5,053,983 A | 10/1991 | Hyatt | |
| 5,115,245 A | 5/1992 | Wen et al. | |
| 5,192,886 A | 3/1993 | Wetlaufer | |
| 5,243,343 A * | 9/1993 | Moriyasu | .............. 341/123 |
| 5,315,627 A | 5/1994 | Draving | |
| 5,386,215 A | 1/1995 | Brown | |
| 5,420,531 A | 5/1995 | Wetlaufer | |
| 5,420,589 A | 5/1995 | Wells et al. | |
| 5,424,735 A * | 6/1995 | Arkas et al. | .............. 341/157 |
| 5,444,459 A * | 8/1995 | Moriyasu | .............. 345/440.1 |
| 5,451,894 A | 9/1995 | Guo | |
| 5,495,260 A | 2/1996 | Couture | |
| 5,510,800 A * | 4/1996 | McEwan | .............. 342/387 |
| 5,523,760 A | 6/1996 | McEwan | |
| 5,552,793 A | 9/1996 | McLeod et al. | |
| 5,661,490 A * | 8/1997 | McEwan | .............. 342/387 |
| 5,748,153 A | 5/1998 | McKinzie, III et al. | |
| 5,805,110 A * | 9/1998 | McEwan | .............. 342/387 |
| 5,900,761 A | 5/1999 | Hideno et al. | |
| 5,900,833 A | 5/1999 | Sunlin et al. | |
| 5,939,912 A | 8/1999 | Rehm | |
| 5,969,667 A | 10/1999 | Farmer et al. | |

(Continued)

FOREIGN PATENT DOCUMENTS

CA 2266222 9/1999

OTHER PUBLICATIONS

Final Office Action issue in U.S. Appl. No. 11/292,433 mailed May 12, 2009.
Notice of Allowance issued in U.S. Appl. No. 11/260,038 on May 29, 2009.
Response to Office Action issued in U.S. Appl. No. 11/292,433, filed Jun. 26, 2009.
International Search Report issued in PCT/US08/064552 on Jul. 7, 2009.
Written Opinion issued in PCT/US08/064552 on Jul. 7, 2009.

(Continued)

*Primary Examiner*—Thomas H Tarcza
*Assistant Examiner*—Peter M Bythrow
(74) *Attorney, Agent, or Firm*—DLA Piper LLP (US)

(57) ABSTRACT

A system for processing a signal comprises a transmit unit to transmit a signal, and a receive unit receiving the signal and performing equivalent time sampling thereon by sampling each cycle of the received signal and reconstructing the received signal from the samples, wherein the receive unit applies a plurality of down-conversion rates to the equivalent time sampling for an acquisition window.

23 Claims, 5 Drawing Sheets

U.S. PATENT DOCUMENTS

| | | | |
|---|---|---|---|
| 5,986,600 | A | 11/1999 | McEwan |
| 6,002,723 | A | 12/1999 | Chethik |
| 6,055,287 | A | 4/2000 | McEwan |
| 6,137,433 | A * | 10/2000 | Zavorotny et al. ......... 342/26 B |
| 6,150,863 | A | 11/2000 | Conn et al. |
| 6,239,764 | B1 | 5/2001 | Timofeev et al. |
| 6,249,242 | B1 | 6/2001 | Sekine et al. |
| 6,281,833 | B1 | 8/2001 | Pringle et al. |
| 6,329,929 | B1 | 12/2001 | Weijand et al. |
| 6,342,866 | B1 | 1/2002 | Ho et al. |
| 6,345,099 | B1 | 2/2002 | Alvarez |
| 6,433,720 | B1 | 8/2002 | Libove et al. |
| 6,501,413 | B2 * | 12/2002 | Annan et al. ............... 342/22 |
| 6,538,614 | B2 | 3/2003 | Fleming et al. |
| 6,580,304 | B1 | 6/2003 | Rieven |
| 6,650,661 | B1 | 11/2003 | Buchanan et al. |
| 6,657,577 | B1 | 12/2003 | Gregersen et al. |
| 6,680,634 | B1 | 1/2004 | Ruha et al. |
| 6,690,741 | B1 | 2/2004 | Larrick, Jr. et al. |
| 6,694,273 | B2 * | 2/2004 | Kurooka et al. ............ 702/69 |
| 6,726,146 | B2 * | 4/2004 | Li et al. .................... 244/3.15 |
| 6,778,000 | B2 | 8/2004 | Lee et al. |
| 6,798,258 | B2 | 9/2004 | Rieven |
| 6,845,458 | B2 | 1/2005 | Lin |
| 6,845,459 | B2 | 1/2005 | Lin |
| 6,853,227 | B2 * | 2/2005 | Laletin ..................... 327/175 |
| 6,853,338 | B2 | 2/2005 | McConnell |
| 6,864,833 | B2 | 3/2005 | Lyon |
| 6,868,504 | B1 | 3/2005 | Lin |
| 6,885,343 | B2 | 4/2005 | Roper |
| 6,912,666 | B2 | 6/2005 | Lin |
| 6,914,468 | B2 | 7/2005 | Van Dijk et al. |
| 6,930,528 | B2 | 8/2005 | Ajit |
| 6,956,422 | B2 | 10/2005 | Reilly et al. |
| 7,020,794 | B2 | 3/2006 | Lin |
| 7,026,850 | B2 | 4/2006 | Atyunin et al. |
| 7,026,979 | B2 * | 4/2006 | Khosla ....................... 342/90 |
| 7,037,266 | B2 * | 5/2006 | Ferek-Petric et al. ....... 600/453 |
| 7,042,385 | B1 | 5/2006 | Wichmann |
| 7,053,814 | B2 | 5/2006 | Yap |
| 7,157,952 | B2 | 1/2007 | Avants et al. |
| 7,203,600 | B2 | 4/2007 | Keers et al. |
| 2002/0000946 | A1 | 1/2002 | Portin |
| 2003/0043078 | A1 | 3/2003 | Deng et al. |
| 2003/0179025 | A1 | 9/2003 | Partsch et al. |
| 2004/0036655 | A1 | 2/2004 | Sainati et al. |
| 2004/0090373 | A1 | 5/2004 | Faraone et al. |
| 2004/0111650 | A1 | 6/2004 | Chen |
| 2004/0178838 | A1 | 9/2004 | Ngo et al. |
| 2005/0200549 | A1 | 9/2005 | Thompson et al. |
| 2005/0237260 | A1 | 10/2005 | Bancroft |
| 2005/0286320 | A1 | 12/2005 | Iwasaki |
| 2006/0038598 | A1 | 2/2006 | Reilly et al. |
| 2006/0038599 | A1 | 2/2006 | Avants et al. |
| 2006/0087471 | A1 | 4/2006 | Hintz |
| 2006/0119407 | A1 | 6/2006 | Abrosimov |
| 2006/0132210 | A1 | 6/2006 | Kong et al. |
| 2006/0203613 | A1 | 9/2006 | Thomsen et al. |
| 2006/0256025 | A1 | 11/2006 | Askildsen |
| 2007/0080864 | A1 | 4/2007 | Channabasappa |

OTHER PUBLICATIONS

Press et al., "Numerical Recipes in C: The Art of Scientific Computing—2nd", Cambridge University Press, Jan. 1, 1992.
Kim et al., "A Resistive Linear Antenna for Ground-Penetrating Radars", 2004, pp. 359-370, vol. 5415, proceedings of SPIE.
Kim et al., "Design of a Resistively Loaded Vee Dipole for Ultrawide-Band Ground-Penetrating Radar Applications", Aug. 2005, pp. 2525-2532, vol. 53, No. 8, IEE Transactions on Antennas and Propagation.
Kim et al., "Design and Realization of a Discretely Loaded Resistive Vee Dipole for Ground-Penetrating Radars", Jul. 2004, pp. 1-9, vol. 39, Radio Science.
Montoya, Thomas P., "Vee Dipole Antennas for use in Short-Pulse Ground-Penetrating Radars", Mar. 1998, Georgia Institute of Technology.
Daniels, Jeffrey J. et al., "Ground Penetrating Radar for Imaging Archeological Objects," Proceedings of the New Millennium International Forum on Conservation of Cultural Property, Dec. 5-8, 2000, pp. 247-265, edited by Suckwon Choi and Mancheol Suh, Institute of Conservation Science for Cultural Heritage, Kongju National University, Kongju, Korea.
Kinlaw, Alton E., et al., "Use of Ground Penetrating Radar to Image Burrows of the Gopher Tortoise (Gopherus polyphemus)," Herpetological Review, 2007, pp. 50-56, vol. 38, No. 1, Society for the Study of Amphibians and Reptiles.
"Energy Focusing Ground Penetrating Radar (EFGPR) Overview," Jan. 28, 2003, pp. 1-12, Geo-Centers, Inc.
Kim et al., Design and Realization of a Discretely Loaded Resistive Vee Dipole on a Printed Circuit Board, 2003, pp. 818-829, vol. 5089, Proceedings of SPIE.
Montoya et al., Land Mine Detection Using a Ground-Penetrating Radar Based on Resistively Loaded Vee Dipoles, Dec., 1999, pp. 1795-1806, vol. 47, No. 12, IEEE Transactions on Antennas and Propagation.
Whiteley, et al., 50 GHz Sampler Hybrid Utilizing a Small Shockline and an Internal SRD, 1991, pp. 895-898, IEEE Microwave Theory & Technique-S Digest.
Tek Sampling Oscilloscopes Technique Primer 47W-7209, October 2989, pp. 1-4, Tektronix, Inc.
Office Action issued in related U.S. Appl. No. 11/260,038 mailed Oct. 17, 2007.
Office Action issued in related U.S. Appl. No. 11/260,038 mailed Mar. 17, 2007.
Office Action issued in related U.S. Appl. No. 11/260,038 mailed Aug. 6, 2008.
Office Action issued in related U.S. Appl. No. 11/754,136 mailed May 12, 2008.
Wikipedia, the free encyclopedia, "Field-Programmable Gate Array", Internet Brief, "http://en.wikipedia.org/wiki/FPGA", search date Sep. 27, 2006, 7 ppgs.
Office Action issued in U.S. Appl. No. 11/754,127 mailed Feb. 26, 2009.
Office Action issued in U.S. Appl. No. 09/273,461 mailed Jan. 21, 2000.
Office Action issued in U.S. Appl. No. 09/273,461 mailed Jul. 6, 2000.
U.S. Appl. No. 09/273,461.
Apr. 20, 2000 Response to Office Action issued Jan. 21, 2000.
Final Office Action issued in U.S. Appl. No. 11/260,038 dated Feb. 5, 2009.
International Search Report issued in International Application No. PCT/US2008/72303, mailed Oct. 22, 2008.
Written Opinion issued in International Application No. PCT/US2008/72303, mailed Oct. 22, 2008.
International Search Report issued in Application No. PCT/US08/064541 mailed Nov. 4, 2008.
Written Opinion issued in Application No. PCT/US08/064541 mailed Nov. 4, 2008.
International Search Report issued in Application No. PCT/US08/072543 mailed Nov. 4, 2008.
Written Opinion issued in Application No. PCT/US08/072543 mailed Nov. 4, 2008.
Office Action issued in U.S. Appl. No. 11/292,433 mailed Nov. 24, 2008.
Office Action issued in U.S. Appl. No. 11/754,136 mailed Jan. 5, 2009.
Notice of Allowance issued in U.S. Appl. No. 11/260,038 on Sep. 25, 2009.
Notice of Allowance issued in U.S. Appl. No. 11/754,127 on Sep. 29, 2009.
Request for Continued Examination (RCE) filed in related U.S. Appl. 11/292,433 on Nov. 10, 2009.

* cited by examiner

SYSTEMS AND METHODS USING MULTIPLE DOWN-CONVERSION RATIOS IN ACQUISITION WINDOWS

CROSS-REFERENCE TO RELATED APPLICATIONS

The present application is related to concurrently filed, co-pending, and commonly assigned U.S. patent application Ser. No. 11/754,127, entitled "SYSTEMS AND METHODS FOR PROVIDING DELAYED SIGNALS"; and U.S. patent application Ser. No. 11/754,136, entitled "SYSTEMS AND METHODS FOR PROVIDING TRIGGER TIMING", the disclosures of which are hereby incorporated herein by reference.

TECHNICAL FIELD

The description relates generally to signal processing techniques and, more specifically, to systems and methods that employ equivalent time sampling with nonlinear sampling profiles.

BACKGROUND OF THE INVENTION

Figure 1:
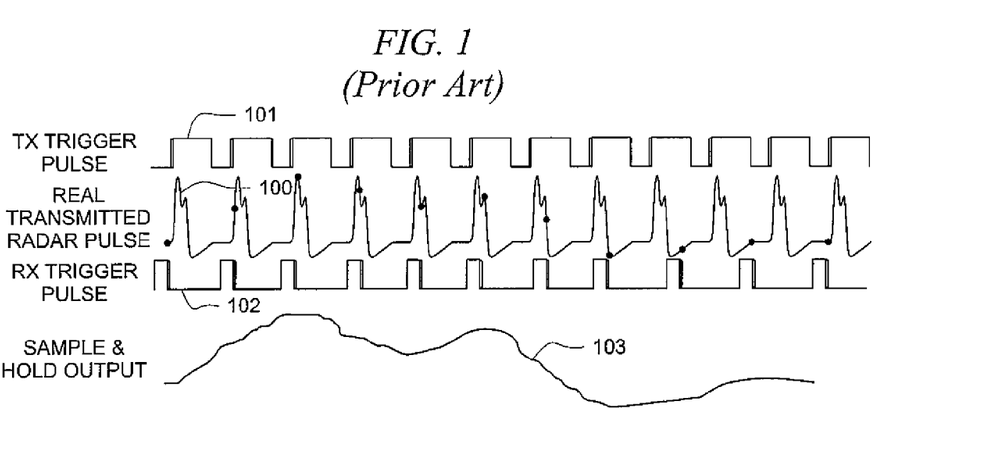
FIG. 1 is an illustration of a wave undergoing equivalent time sampling.

FIG. 1 is an illustration of wave 100 undergoing equivalent time sampling. The positive edge of transmit trigger pulse 101 causes a transmitter (not shown) to transmit a signal that returns to the receiver as wave 100. The negative edge of receive trigger pulse 101 causes a receive unit (not shown) to listen to wave 101, thereby sampling it and holding it for a very short window. Each subsequent negative edge of receive trigger pulse 102 is increasingly offset from its corresponding transmit trigger pulse positive edge so that subsequent samples advance over the contour of a cycle of wave 100. Sample and hold output 103 is a reconstructed pulse of wave 101, stretched out in time. The increasing offset of receive trigger pulse 102 affects the resolution—an offset that increases rapidly between transmit/receive pulse pairs will generally "see" less of wave 100, while an offset that increases more slowly will generally see more of wave 100.

Figure 2:
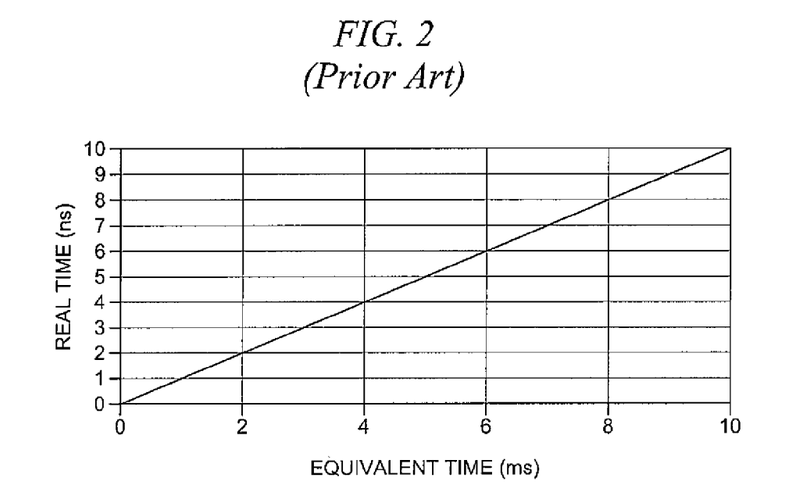
FIG. 2 shows a linear sampling profile of the prior art.

Conventional equivalent time sampling systems can be used with time domain radar to effect a time-stretch of the received radar signals, as shown in FIG. 1. For example, if each pulse cycle of wave 100 lasts ten nanoseconds, it may be down-converted by an equivalent time sampling approach and stretched to an equivalent shape in a ten millisecond period. If this down-conversion is accomplished using a linear profile (i.e., the time offset increases linearly for subsequent transmit/receive pairs across the sampled time period), the resolution and fidelity of output 103 will generally be constant across the sampled time period. FIG. 2 shows a linear sampling profile of the prior art.

It should be noted that in radar systems, later parts of a received waveform are generally considered to be reflected from objects that are farther away, such that as the real time axis of FIG. 2 increases, the information in those samples is often associated with greater ranges (and in the case of ground penetrating radar, depths). It should also be noted that attenuation due to ground per unit depth increases as frequency increases and is especially pronounced at frequencies above 1 GHz. Because of this phenomenon, it is more feasible to have higher fidelity and greater Signal to Noise Ratio (SNR) for the near-time (shallow) range. By contrast, for the late time range, higher fidelity is often less feasible, due to the attenuation of higher frequencies at greater depths. Further, deeper objects tend to be larger, such that higher resolution is often unnecessary.

Radar systems typically generate a frame of data during an acquisition window, the acquisition window being measured in equivalent time. Shorter frames generally provide less information by sacrificing resolution and/or range, whereas longer frames decrease the rate at which a radar system can scan an area (i.e., its advance rate), since the number of frames per second is lower. Accordingly, radar designers are often faced with competing parameters—frame size/advance rate and resolution/range.

One way to see at greater ranges using the same frame length is to change the equivalent time sample down-conversion ratio to expand the real time range, thereby covering more real time range in the same equivalent time. This can be accomplished, for example, by using a greater rate of increase for the time offset between subsequent transmit/receive operations. Prior art systems use a single down-conversion ratio (as in FIG. 2), thereby producing the same resolution for all parts of an acquisition window. Therefore, for the same number of samples in a frame, such range expanding lowers the resolution of the output across the frame in prior art systems. It follows that increasing the resolution for the same frame size and number of samples decreases the range of the acquisition window in prior art systems. Currently, there is no system that provides performance at near and far ranges without sacrificing resolution of near range data and without significantly expanding frame sizes.

BRIEF SUMMARY OF THE INVENTION

Various embodiments of the present invention are directed to systems and methods which provide multiple down-conversion ratios for a given acquisition window. Accordingly, it is possible for some embodiments to provide higher resolution performance at some ranges and lower resolution at other ranges for a given frame size and number of samples. For example, one system provides a higher resolution down-conversion ratio for near ranges and for longer ranges uses a different down-conversion ratio that trades some resolution for additional range. Since high resolution is often not feasible for farther ranges, the decrease in resolution for the far range is generally not disadvantageous.

Various embodiments may employ any type of non-linear or non-singular down-conversion ratio profile. Some example profiles include two or more different down-conversion ratios and/or a continuously variable ratio that is different for each sample point.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 3:
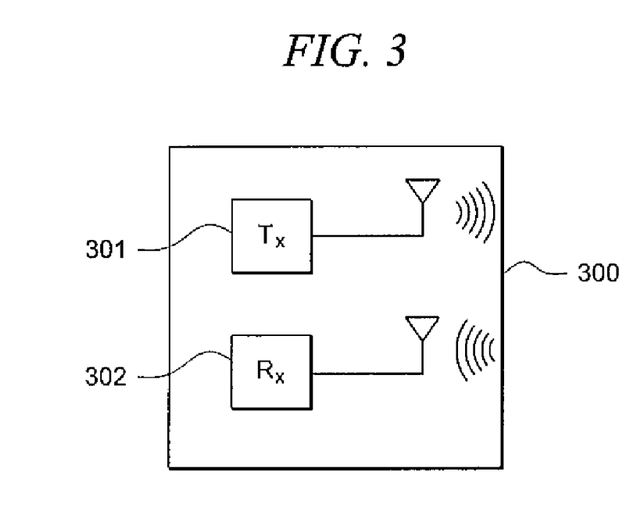
FIG. 3 is an illustration of an exemplary system adapted according to one embodiment of the invention.

FIG. 3 is an illustration of exemplary system 300 adapted according to one embodiment of the invention. System 300 is a system for processing a signal, and it includes transmitter unit 301 and receiver unit 302. Transmitter unit 301 transmits a signal, and receiver unit 302 detects the signal when it is reflected and/or refracted by another object (not shown). One example of a system that utilizes transmitter and receiver units is a radar system that employs Radio Frequency (RF) signals to detect, locate, and/or identify objects.

In this example, receiver unit 302 applies equivalent time sampling to reconstruct the received waveform. Further, receiver unit 302 applies a plurality of down-conversion rates to the equivalent time sampling for a given acquisition window. "Acquisition window", as used herein, is the amount of real time used to receive reflections from a transmitted signal. For instance, for an acquisition window of length T, for the first part (T1) receiver unit 302 can apply a first down-conversion rate to the received signal and for the a second part (T2) the receiver unit can apply a second down-conversion rate to the signal. Note that in this simple example T=T1+T2. Also note that the acquisition window could be broken up into more than 2 parts, T=T1+T2+T3, and so on, as appropriate. An example of an acquisition window is the ten nanosecond period shown in the Y-axis of FIG. 2.

Figure 4:
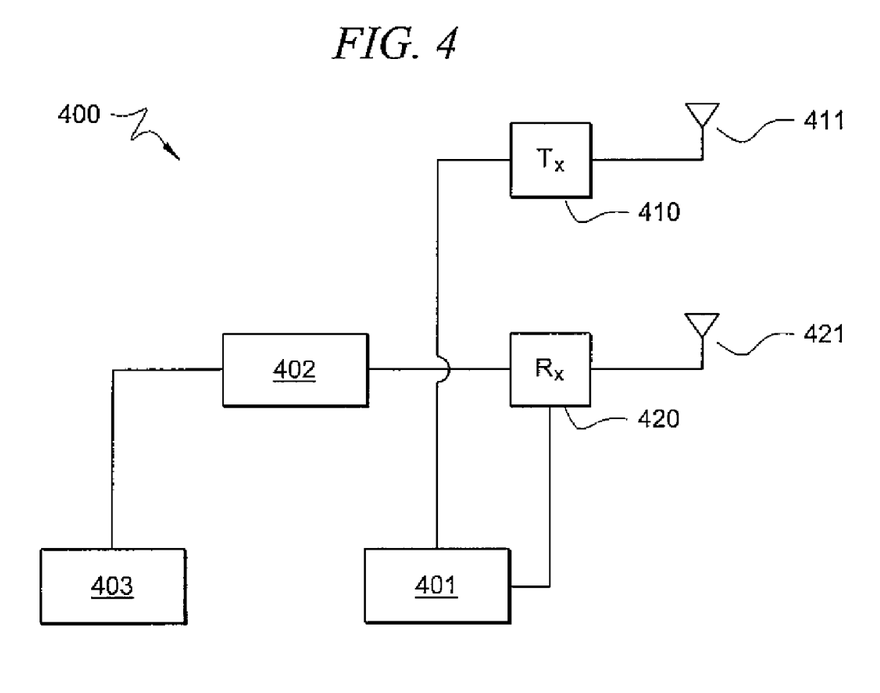
FIG. 4 is an illustration of an exemplary system adapted according to one embodiment of the invention.

FIG. 4 is an illustration of exemplary system 400 adapted according to one embodiment of the invention to apply a plurality of down conversion rates. System 400 represents one configuration for system 300 (with more details shown). System 400 includes RE units 410 and 420, which in this example are transceivers that operate antennas 411 and 421, respectively. It should be noted that FIGS. 3 and 4 show transmitting and receiving portions as separate components; however, various embodiments are not limited thereto, as some embodiments may include a single transceiver and antenna to perform both transmission and reception.

System 400 further includes control unit 401 that triggers RF units 410 and 420. In some examples, control unit 401 is a processor-based device that uses some amount of intelligence to determine appropriate triggering times or to execute software/firmware to control triggering. In simpler embodiments, control unit 401 can include a clock and related circuitry, but without a large amount of processing power. In other embodiments, control unit 401 may include control circuitry and a switched delay line, as described in U.S. patent application Ser. No. 11/754,127, entitled, "SYSTEMS AND METHODS FOR PROVIDING DELAYED SIGNALS," filed concurrently herewith, the disclosure of which is hereby incorporated herein by reference. In fact, any control/trigger system now known or later developed that is capable of performing the equivalent time sampling technique described herein can be used in some embodiments. In this example, it is the receive trigger that performs the receive sampling by turning RF unit 420 "on" during certain times to sample and hold portions of the received waveform. Such sampling is used by various embodiments to provide two or more down-conversion rates to the received signal.

Analog-to-Digital Converter (ADC) 402 receives the sampled signal from RF unit 220, performs its own sampling, and digitizes the signal, thereby digitally reconstructing at least one cycle of the received waveform. The digitized wave is input to processor-based device 403, which in some examples is a personal computer or other computer that is capable of processing the received signal to derive information therefrom (e.g., determining the location and shape of an object). Processor based device 403 may provide output that is meaningful to a human user, such as a visual display of the derived information.

The configuration of system 400 is exemplary, as other embodiments may use other configurations. For instance, various functional units may be integrated into a single component (e.g., ADC 402 included in processor-based device 403), or various functions may be distributed among components (e.g., multiple processor-based devices each performing a different function), and/or other components may be added (e.g., additional storage units).

Figure 5:
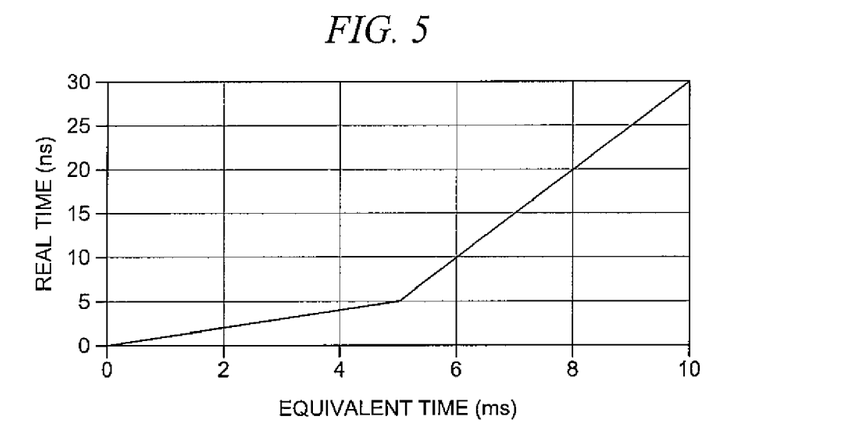
FIG. 5 is a graph showing an exemplary equivalent time sampling technique that employs two down-conversion ratios.

FIG. 5 is a graph showing an exemplary equivalent time sampling profile that includes two down-conversion ratios. In contrast with a prior art range profile (e.g., FIG. 2), the range profile of FIG. 5 is non-linear. For the first five milliseconds of equivalent time, the offset between subsequent transmit/receive pairs is increasing at a first constant rate. For the next five milliseconds, the offset is increasing at a second, constant, and faster rate.

In the first half of the acquisition window the first five milliseconds is equivalent to the first five nanoseconds of the real time range window. The second half of the acquisition window includes the last five milliseconds of equivalent time, but accounts for twenty-five nanoseconds of real time. In other words, the second half of the acquisition window includes more real time (at a lower resolution and in the same number of samples) compared to the first half. In fact, the range profile of FIG. 5 provides performance at up to a range of thirty nanoseconds, whereas the profile of FIG. 2 only provides performance up to a range of ten nanoseconds. Thus, a system using the range profile of FIG. 5 can "see" three times as far as a system using the range profile of FIG. 2. A range profile, such as that shown in FIG. 5, may provide more optimum performance for both near and far ranges without increasing the time per acquisition window or number of samples per acquisition window.

Such a range profile can be produced by systems 300 (FIG. 3) and system 400 (FIG. 4). For instance, system 400 can use control unit 401 to change the rate of increase of the time offset of the receive pulse during the acquisition window.

In one particular example, system 400 employs an eight megahertz pulse repetition rate. In such a scenario, an equivalent time acquisition window of ten milliseconds gives 80,000 equivalent time samples per window. This will remain true as long as the time offset for each particular transmit/receive pair does not exceed the total time for one cycle. System 400 can then change the rate of increase of the time offset during an acquisition window to produce a range profile as shown in FIG. 5. In other words a given system can change the rate of time offset increase to use the 80,000 samples over a larger or smaller real time period, as desired. However, as the amount of real time increases, the resolution decreases (assuming that the number of samples stays constant).

The next step in many radar systems is to digitize the equivalent time output. Continuing with this example (using an eight megahertz pulse repetition rate and the range profile of FIG. 5), system 400 uses a constant rate ADC that samples at one mega sample per second to give 10,000 samples for ten milliseconds of equivalent time. Such a sampling technique produces 5,000 digital samples for the first five nanoseconds of real time and 5,000 digital samples for the last twenty-five nanoseconds of real time. In other words, example system 400 uses 5,000 digital samples and 40,000 equivalent time samples to acquire 5 nanoseconds of real time. In the second half of the acquisition window, system 400 uses 5,000 digital samples and 40,000 equivalent time samples to acquire twenty-five nanoseconds in real time. One advantage of such a technique is that it does not sacrifice resolution for the first five nanoseconds, and in the second part of the graph (where resolution is generally less of a concern) system 400 provides twenty-five nanoseconds of real time without using more equivalent time or more samples. During the next acquisition window, system 400 can use the same range profile or a different range profile.

Figure 6A:
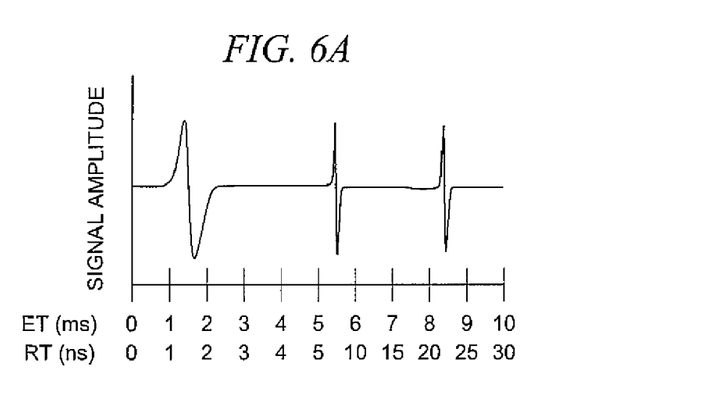
FIG. 6A is a graph of example receive signal amplitude versus real and equivalent time for an exemplary system using the range profile shown in FIG. 5.

FIG. 6A is a graph of example receive signal amplitude versus real and equivalent time for an exemplary system using the range profile shown in FIG. 5. FIG. 6A includes example radar returns from objects located at one nanosecond, seven nanoseconds, and twenty-one nanoseconds from the system's aperture. The return from the object located at one nanosecond falls within the first five milliseconds of equivalent time and is down-converted at a different down-conversion ratio than the returns from objects at seven nanoseconds and twenty-one nanoseconds. It should be noted that that the seven nanosecond and twenty-one nanosecond returns are one-fifth the width in equivalent time of the one nanosecond return and also are each one-fifth the resolution of the one nanosecond return. However, in the same ten millisecond acquisition window, it is possible to have a range profile as deep as thirty nanoseconds without sacrificing the resolution of the one nanosecond return.

Figure 6B:
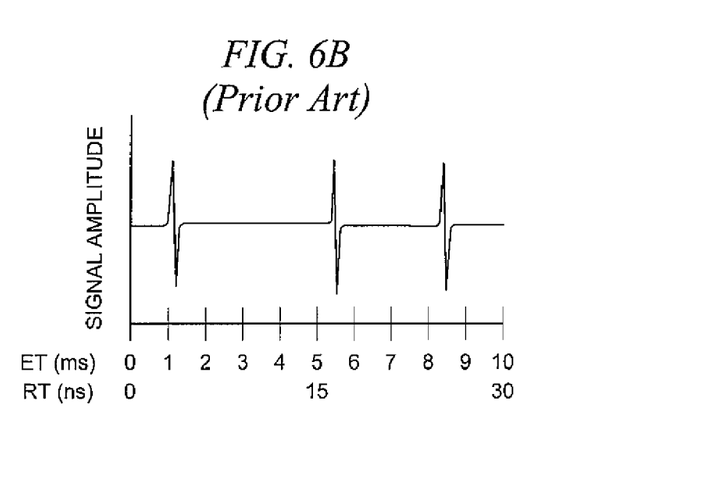
FIG. 6B is a graph of an example receive signal amplitude versus real and equivalent time for a prior art system using a constant range profile.

By contrast, FIG. 6B is a graph of an example receive signal amplitude versus real and equivalent time for a prior art system using a constant range profile. FIG. 6B includes example radar returns from objects located at one nanosecond, seven nanoseconds, and twenty-one nanoseconds from the system's aperture. The return from the object located at one nanosecond is down-converted at the same ratio as the returns from objects at seven nanoseconds and twenty-one nanoseconds, thereby providing less resolution for the object at one nanosecond compared to the graph of FIG. 6A.

An alternative way of thinking about the range profiles of FIGS. 2 and 5 is to consider their first derivatives. The first derivative of a given range profile provides the down-conversion ratio at each equivalent time sample point. A linear range profile (as in FIG. 2) has a constant first derivative. The range profile of FIG. 5, by contrast, has a discontinuous first derivative with two separate down-conversion ratios, one for early time and a higher one for later time.

Figure 7A:
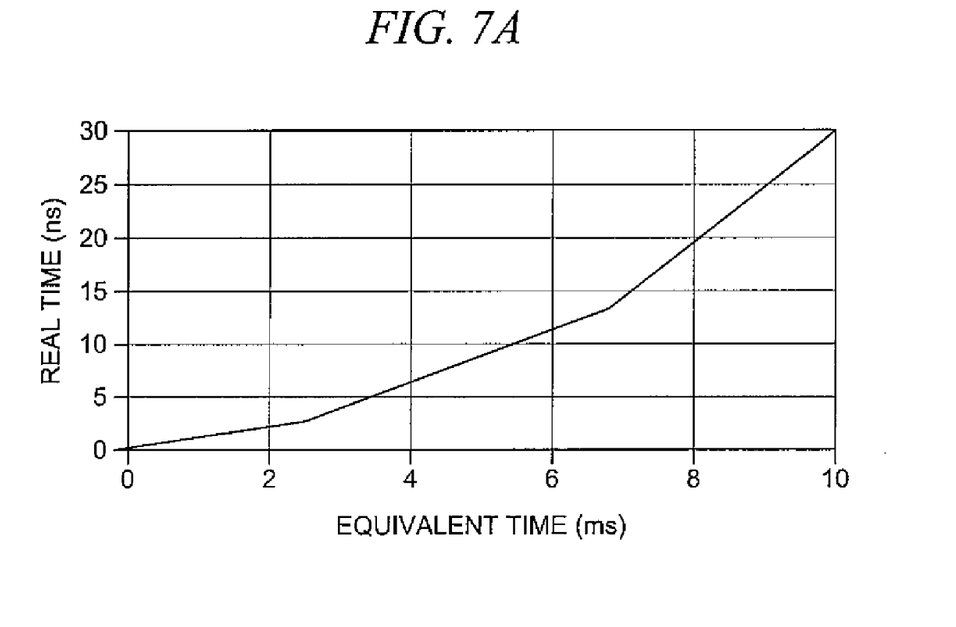
FIG. 7A shows a range profile, adapted according to one embodiment of the invention, that uses three down-conversion ratios.
Figure 7B:
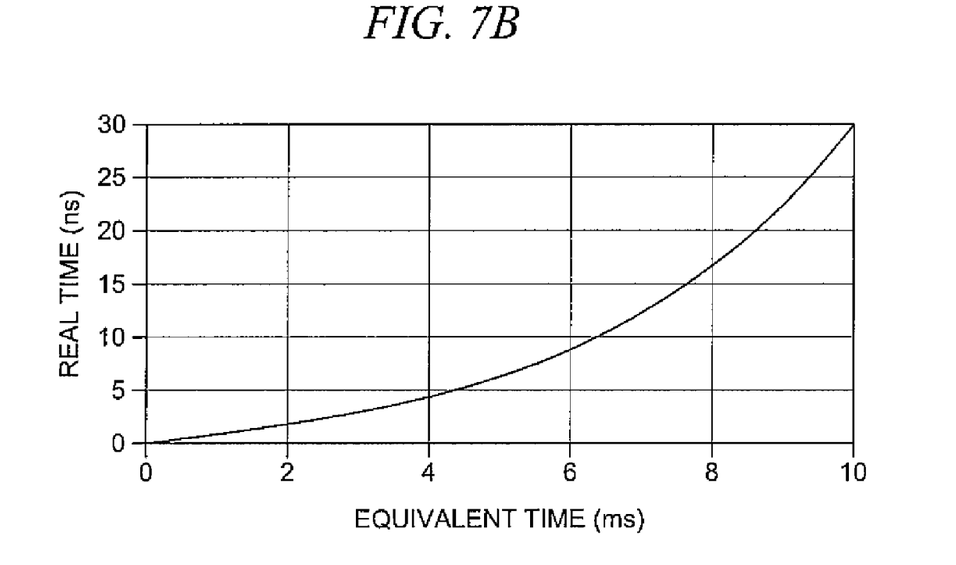
FIG. 7B shows a range profile, adapted according to one embodiment of the invention, that uses a continuously varying down-conversion ratio.

Various embodiments of the invention are not limited to the range profile shown in FIG. 5. Some embodiments can use range profiles that include three, four, or more down-conversion ratios and can even include range profiles that have a continuously changing down-conversion ratio. Examples of other down-conversion ratios that can be adapted for use with various embodiments are shown in FIGS. 7A and B. FIG. 7A shows a range profile that uses three down-conversion ratios.

FIG. 7B shows a range profile that uses a continuously varying down-conversion ratio. As in FIG. 5, each one can be implemented by varying a rate of increase of a time offset in transmit/receive pairs in a given acquisition window.

Figure 8:
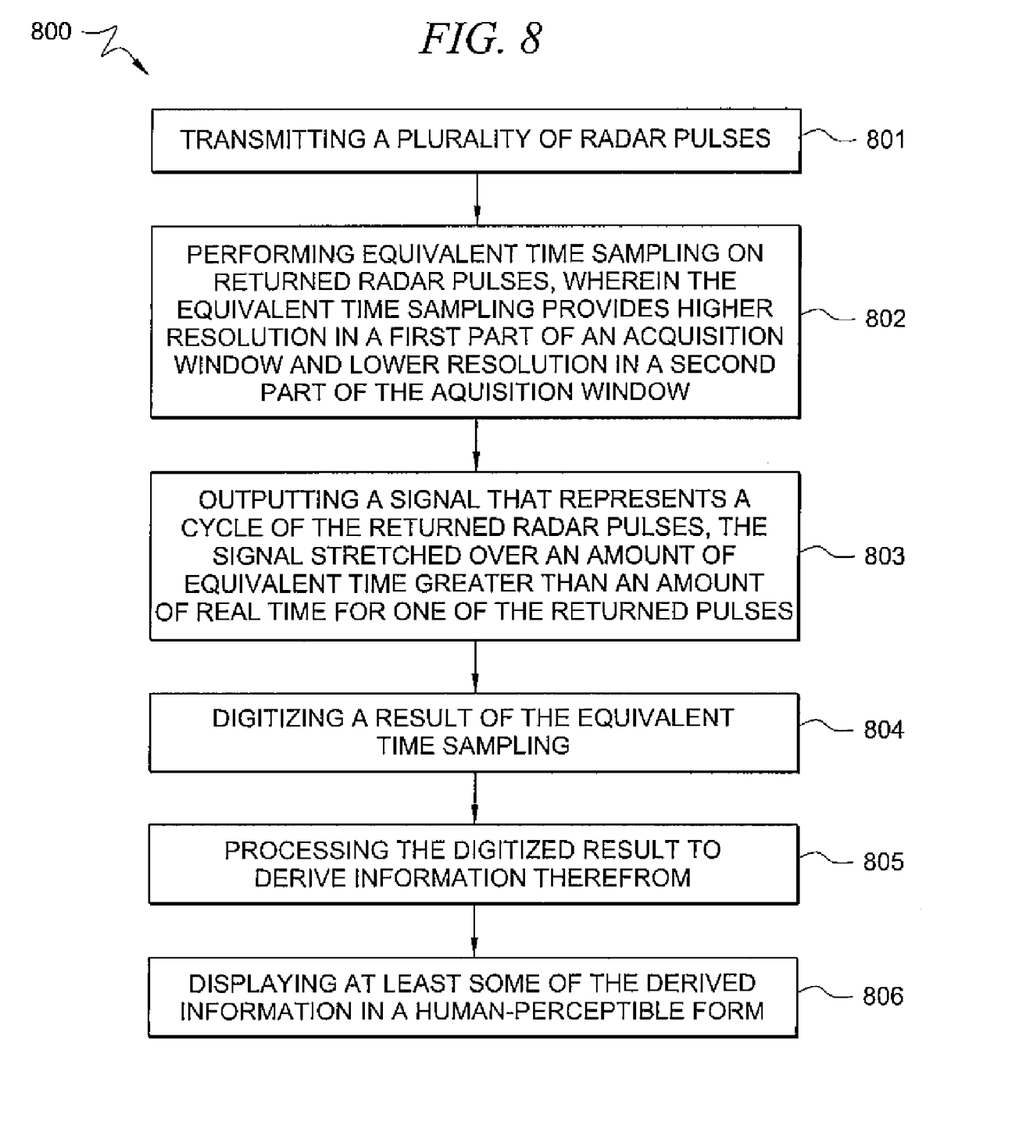
FIG. 8 is an illustration of an exemplary method adapted according to one embodiment of the invention.

FIG. 8 is an illustration of exemplary method 800 adapted according to one embodiment of the invention. Method 800 may be performed by a system, such as systems 300 and 400 (FIGS. 3 and 4, respectively).

In step 801, a plurality of radar pulses are transmitted. Step 801 may be performed, for example, by an RF module in communication with an antenna element.

In step 802, equivalent time sampling is performed on the returned radar pulses, wherein the equivalent time sampling provides higher resolution in a first part of an acquisition window and lower resolution in a second part of the acquisition window. In one example, a system applies a range profile to the received pulses that is the same as or similar to those shown in FIGS. 5, 7A, and 7B.

In step 803, a signal is output that represents a cycle of the returned radar pulses, the signal stretched over an amount of equivalent time greater than an amount of real time for one of the returned pulses. In this example, the cycles of the returned radar pulses are substantially similar to each other, and the output of the equivalent time sampling is generally used to output a signal that represents one of those cycles. Further, in one example, each cycle of the returned radar pulse may occupy a real time period of a few nanoseconds, whereas the reconstructed signal may occupy a period of equivalent time of a few milliseconds.

In step 804, the result of the equivalent time sampling is digitized. In step 805, the digitized result is processed to derive information therefrom. Steps 804 and 805 may be performed, for example, by a processor-based device, such as a device that employs a general purpose microprocessor, an Application Specific Integrated Circuit (ASIC), a Field Programmable Gate Array (FPGA), and/or the like. An example of deriving information from the digitized result includes processing some or all of the information with radar algorithms to determine information about objects that reflect and/or refract the transmitted signal. Examples of derived information include, but are not limited to, presence of an object, position of an object, speed/acceleration of an object, nature of an object, and/or the like.

In step 806, at least some of the derived information is displayed in a human-perceptible form. For example, a given system may include a computer monitor or other type of display that includes a visual interface that includes results of the processing. However, various embodiments are not limited to visual displays, as some embodiments may provide other kinds of human-perceptible information, such as audio information.

Method 800 is shown as a series of discrete steps. However, other embodiments of the invention may add, delete, repeat, modify and/or rearrange various portions of method 800. For example, transmitting radar pulses and receiving radar pulses are generally repeated many times during an acquisition window, with a given transmit operation followed by a corresponding receive operation.

Further, while method 800 focuses on the operation of a radar system, various embodiments may be adapted for use in other kinds of systems. For example, oscilloscopes are often used to measure a waveform from a device under test. In such a system, current from the system under test carried on a wire takes the place of radar pulses. The oscilloscope may be adapted so that its triggers facilitate the equivalent time sampling technique of step 802.

Further, many embodiments provide higher resolution for nearby objects and lower resolution for far objects. However, various embodiments can be adapted to provide higher resolution for far objects and lower resolution for nearby objects, if desired.

Various embodiments of the present invention provide one or more advantages over prior art systems. For example, prior art systems generally have a fixed down-conversion ratio, such that either resolution for nearby objects or range must be sacrificed for a given acquisition window and number of samples. By contrast, various embodiments of the present invention can use different down-conversion ratios within the same acquisition window to provide higher resolution for nearby objects while trading resolution for range in a later part of the acquisition window. Some embodiments can provide such a feature with the same acquisition window size and number of samples.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for processing a signal, the system comprising:
a transmit unit to transmit a signal; and
a receive unit receiving a reflection of the signal and performing equivalent time sampling thereon by sampling each cycle of the received signal and reconstructing the received signal from the samples, wherein the receive unit applies a plurality of down-conversion rates to the equivalent time sampling for an acquisition window.

2. The system of claim 1 further comprising:
a processor-based device receiving the reconstructed signal and applying algorithms thereto to derive information from the reconstructed signal.

3. The system of claim 2 further comprising:
a display associated with the processor-based device presenting at least some of said derived information in a humanly-perceptible form.

4. The system of claim 1 wherein said system is a radar system, and wherein said transmitted signal is a series of pulses.

5. The system of claim 1 wherein the plurality of down conversion rates comprises two different down conversion rates in the acquisition window.

6. The system of claim 1 wherein the plurality of down-conversion rates includes a continuously varying down-conversion rate.

7. The system of claim 1 wherein the receive unit equivalent time sampling provides higher resolution for neat ranges and lower resolution for far ranges in the acquisition window.

8. A method for processing a signal, the method comprising:
performing a plurality of signal transmit and receive operation pairs, wherein each subsequent receive operation is temporally spaced from its respective transmit operation by an increasing time offset to perform equivalent time sampling, the equivalent time sampling being performed with a plurality of down conversion rates for a given acquisition window.

9. The method of claim 8 wherein said time offset increases at a continuously changing rate throughout the acquisition window.

10. The method of claim 8 wherein said time offset increases at a first rate during a first part of the acquisition window and at a second rate during a second part of the acquisition window.

11. The method of claim 8 wherein said acquisition window comprises:
a period of real time over which said samples are taken.

12. The method of claim 8 wherein said method is performed by a device selected from a list consisting of:
an oscilloscope and device under test; and a radar system.

13. The method of claim 8 further comprising:
outputting a reconstructed signal based on said receive operations in said acquisition window, the reconstructed signal representing one cycle of a received signal.

14. The method of claim 13 further comprising:
processing said reconstructed signal and displaying results of said processing.

15. The method of claim 14 wherein said results of said processing include items selected from the list consisting of:
a presence of an object determined by said processing;
a shape of an object determined by said processing;
a speed of an object determined by said processing; and
the nature of an object determined by said processing.

16. The method of claim 8 wherein said transmit and receive operations are performed by a same transceiver and antenna element.

17. A method for processing radar information, said method comprising:
transmitting a plurality of radar pulses; and
performing equivalent time sampling on returned radar pulses, wherein said equivalent time sampling provides higher resolution in a first part of an acquisition window and lower resolution in a second part of said acquisition window by applying different down conversion rates in each of said first part and said second part of said acquisition window.

18. The method of claim 17 wherein said first part of said acquisition window includes information about first objects, and wherein said second part of said acquisition window includes information about second objects, said first object being nearer to a transmitter of said radar pulses than said second objects.

19. The method of claim 17 wherein said acquisition window comprises:
   an amount of real time over which samples of said transmitted signals are taken.

20. The method of claim 17 further comprising:
   outputting a signal that represents a cycle of said returned radar pulses, said signal stretched over an amount of equivalent time greater than an amount of real time for one of said returned pulses.

21. The method of claim 17 further comprising digitizing a result of said equivalent time sampling.

22. The method of claim 21 further comprising:
   processing said digitized result to derive information therefrom; and
   displaying at least some of said derived information in a human-perceptible form.

23. The method of claim 22 wherein said derived information is selected from the list consisting of:
   the presence of an object;
   the shape of an object;
   an object's velocity;
   the nature of an object; and
   the position of an object.

* * * * *